US011191066B2

United States Patent
Tang

(10) Patent No.: US 11,191,066 B2
(45) Date of Patent: Nov. 30, 2021

(54) METHOD FOR TRANSMITTING DATA, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 235 days.

(21) Appl. No.: 16/286,183

(22) Filed: Feb. 26, 2019

(65) Prior Publication Data
US 2019/0200328 A1    Jun. 27, 2019

Related U.S. Application Data

(63) Continuation of application No. PCT/CN2017/093866, filed on Jul. 21, 2017.

(51) Int. Cl.
*H04W 72/04* (2009.01)
*H04L 5/00* (2006.01)
*H04W 72/12* (2009.01)

(52) U.S. Cl.
CPC .......... *H04W 72/042* (2013.01); *H04L 5/00* (2013.01); *H04L 5/0044* (2013.01);
(Continued)

(58) Field of Classification Search
CPC ... H04W 72/042; H04W 72/04; H04W 72/12; H04W 72/0446; H04L 5/00;
(Continued)

(56) References Cited

U.S. PATENT DOCUMENTS

2004/0109421 A1    6/2004  Stogner et al.
2008/0107192 A1*   5/2008  Mukkavilli ........... H04L 5/0048
                                                        375/260
(Continued)

FOREIGN PATENT DOCUMENTS

CN    106231677 A    12/2016
CN    106686740 A     5/2017
(Continued)

OTHER PUBLICATIONS

International Search Report for PCT/CN2017/093866 dated Mar. 29, 2018 and its English translation provided by WIPO.
(Continued)

*Primary Examiner* — Gregory B Sefcheck
*Assistant Examiner* — Joshua Smith
(74) *Attorney, Agent, or Firm* — Ladas & Parry, LLP

(57) ABSTRACT

The present application discloses a method for transmitting data, a terminal device and a network device, the method includes: receiving, by the terminal device, a control channel carrying resource indication information on a first time domain unit; if the value on the second bit field belongs to a first value set, determining, by the terminal device, that the at least one time domain symbol refers to all time domain symbols in a first symbol set; if the value on the second bit field belongs to a second value set, determining, by the terminal device, that the at least one time domain symbol refers to a time domain symbol in a second symbol set corresponding to the value on the second bit field; and transmitting, by the terminal device, the data channel on the at least one time domain symbol.

18 Claims, 10 Drawing Sheets

(52) U.S. Cl.
CPC .......... *H04L 5/0051* (2013.01); *H04L 5/0053* (2013.01); *H04L 5/0091* (2013.01); *H04W 72/04* (2013.01); *H04W 72/0446* (2013.01); *H04W 72/12* (2013.01)

(58) Field of Classification Search
CPC ... H04L 5/0091; H04L 5/0044; H04L 5/0051; H04L 5/0053
See application file for complete search history.

(56) References Cited

U.S. PATENT DOCUMENTS

| | | | | |
|---|---|---|---|---|
| 2008/0227388 | A1* | 9/2008 | Popovski | H04B 7/2603 455/17 |
| 2010/0054182 | A1* | 3/2010 | Bachir | H04W 76/14 370/328 |
| 2010/0061333 | A1* | 3/2010 | Marsh | H04W 4/00 370/330 |
| 2014/0003400 | A1* | 1/2014 | Lim | H04L 1/1861 370/336 |
| 2014/0016596 | A1* | 1/2014 | Kim | H04L 1/0061 370/329 |
| 2014/0071961 | A1* | 3/2014 | Nigam | H04W 72/04 370/336 |
| 2016/0227545 | A1* | 8/2016 | Yang | H04W 16/14 |
| 2017/0289966 | A1* | 10/2017 | Islam | H04W 72/042 |
| 2017/0366377 | A1* | 12/2017 | Papasakellariou | H04L 5/005 |
| 2018/0042040 | A1* | 2/2018 | Chen | H04W 72/1263 |

FOREIGN PATENT DOCUMENTS

| | | |
|---|---|---|
| CN | 106911999 A | 6/2017 |
| WO | 2019014923 A1 | 1/2019 |

OTHER PUBLICATIONS

Written Opinion for PCT/CN2017/093866 dated Mar. 29, 2018 and its English translation provided by Google translate.
The first Office Action of corresponding European application 17918229.0, dated Mar. 6, 2020.
Extended European search report dated Sep. 23, 2019, Appln. No. 17918229.0.
AT&T: "Multiplexing between PDCCH and PDSCH for various data durations", R1-1707729 (3GPP); mobile competence centre; 650, ruote des lucioles; F-06921 Sophia-Antipolis Cedex; vol. RAN WG1, No. Hangzhou; May 15, 2017-May 19, 2017 May 14, 2017.
AT&T: "Transmission duration indication for symbol-level/slot-level/multi-slot-level scheduling", R1-1710414 ATT TDM (3GPP); vol. RAN WG1, No. Qingdao, P.R. China; Jun. 27, 2017-Jun. 30, 2017; Jun. 26, 2017.
Guangdong Oppo Mobile Telecom: "Time-domain resource allocation for NR"; R1-1710165 (3GPP); vol. RAN WG1, No. Qingdao, P.R. China; Jun. 27, 2017-Jun. 30, 2017; Jun. 26, 2017.

* cited by examiner

METHOD FOR TRANSMITTING DATA, TERMINAL DEVICE AND NETWORK DEVICE

CROSS-REFERENCE TO RELATED APPLICATION

This application is a continuation application of the International application PCT/CN2017/093866, filed on Jul. 21, 2017, entitled "METHOD FOR TRANSMITTING DATA, TERMINAL DEVICE AND NETWORK DEVICE", the content of which is hereby incorporated by reference in its entirety.

TECHNICAL FIELD

Embodiments of the present application relate to the field of wireless communication, and more particularly, to a method for transmitting data, a terminal device and a network device.

BACKGROUND

In a long term evolution (LTE) system, a network device schedules a data channel resource of a terminal device based on time slots, using a slot or a subframe as a unit for each scheduling, therefore, this manner of resource scheduling may also be referred to as slot-based scheduling. The network device only needs to indicate an offset of the time slot where a data channel is located relative to the time slot where a control channel is located when performing a resource indication, and the latter few symbols in the time slot or subframe where the data channel is located are regularly used for transmitting the data channel.

A 5G system or a new radio (NR) system supports a more flexible resource scheduling manner. The network device can schedule the data channel to be transmitted at any position in the time slot, and the unit for each scheduling may be a time domain symbol. Therefore, this resource scheduling manner can also be referred to as non-slot-based scheduling. When performing the resource scheduling, the network device may use a slot-based scheduling manner or a non-slot-based scheduling manner. However, when using different scheduling manners to schedule the data channel resource, the network device needs to indicate not only the used resource scheduling manner, but also a specific data channel resource to the terminal device, thus resulting in additional control signaling overhead. Moreover, a complexity of blind detection of the terminal device is increased due to different contents and sizes of resource information that is related to the data channel resource and required to be indicated in two resource scheduling manners.

SUMMARY

Embodiments of the present application provide a method for transmitting data, a terminal device and a network device, which can effectively implement resource scheduling and reduce the complexity of blind detection of the terminal device.

In a first aspect, there is provided a method, including: receiving, by a terminal device, on a first time domain unit, a control channel transmitted by a network device, where the control channel carries resource indication information, the resource indication information includes a first bit field and a second bit field, the first bit field indicates a second time domain unit for transmitting a data channel scheduled by the control channel, the second bit field indicates at least one time domain symbol occupied by the data channel in the second time domain unit, and the time domain unit including a plurality of time domain symbols;

if a value on the second bit field belongs to a first value set, determining, by the terminal device, that the at least one time domain symbol refers to all time domain symbols in a first symbol set;

if the value on the second bit field belongs to a second value set, determining, by the terminal device, that the at least one time domain symbol refers to a time domain symbol in a second symbol set corresponding to the value on the second bit field, where the second value set does not overlap with the first value set;

transmitting, by the terminal device, the data channel with the network device on the at least one time domain symbol in the second time domain unit.

Therefore, in the embodiments of the present application, the terminal device determines, according to an implicit indication of the network device, a data channel resource used for transmitting the data channel, and no matter which scheduling manner is used for scheduling the data channel resource, all the control channels used to schedule the data channel include the same channel structure to indicate the data channel resource, thereby effectively implementing resource scheduling and reducing the complexity of the blind detection of the terminal device.

In a possible implementation form, where the determining, by the terminal device, that the at least one time domain symbol refers to a time domain symbol in a second symbol set corresponding to the value on the second bit field includes: determining, by the terminal device, symbol information corresponding to the value on the second bit field according to the value on the second bit field, where the symbol information including a position of a start-stop symbol in the at least one time domain symbol and/or a number of the at least one time domain symbol, and the start-stop symbol including a start time domain symbol and/or an end time domain symbol; determining, by the terminal device, the at least one time domain symbol in the second symbol set according to the symbol information.

In a possible implementation form, if the symbol information includes the position of the start-stop symbol, the value on the second bit field represents a number of time domain symbols that separate the start-stop symbol from a reference symbol.

In a possible implementation form, the reference symbol includes: a first time domain symbol in the first time domain unit; or a first reference symbol, where the first reference symbol is separated from a start time domain symbol or an end time domain symbol for transmitting the control channel by an integer number of time domain units, and the first reference symbol and the start-stop symbol are separated by less than one time domain unit; or a second reference symbol, where the second reference symbol is separated from a start time domain symbol or an end time domain symbol for transmitting a control resource set by an integer number of time domain units, and the second reference symbol and the start-stop symbol are separated by less than one time domain unit.

In a possible implementation form, if the value on the second bit field belongs to the second value set, the method further includes: transmitting, by the terminal device, a reference signal with the network device on a start time domain symbol of the at least one time domain symbol or on a previous adjacent time domain symbol of the start time domain symbol.

In a possible implementation form, if the value on the second bit field belongs to the first value set, the method further includes: transmitting, by the terminal device, a reference signal with the network device on a preset time domain symbol in the second time domain unit.

In a possible implementation form, the preset time domain symbol is a third time domain symbol or a fourth time domain symbol in the second time domain unit.

In a possible implementation form, a value on the first bit field represents a number of time domain units that separate the second time domain unit from the first time domain unit.

In a possible implementation form, if frequency bands for transmitting the data channel are different, the first symbol set is the same or the first symbol sets are different.

In a possible implementation, where the receiving, by a terminal device, on a first time domain unit, a control channel transmitted by a network device includes: receiving, by the terminal device, on the first time domain unit, downlink control information (DCI) which is transmitted by the network device and carried in the control channel, where the DCI including the resource indication information.

In a possible implementation form, the time domain unit is a time slot or a subframe.

In a possible implementation form, the reference signal is a demodulation reference signal (DMRS).

In a second aspect, there is provided a method for transmitting data, includes: determining, by a network device, a second time domain unit for transmitting a data channel and at least one time domain symbol occupied by the data channel in the second time domain unit, where the time domain unit including a plurality of time domain symbols; if the at least one time domain symbol refers to all time domain symbols in a first symbol set, setting, by the network device, a value on a second bit field in resource indication information to be transmitted to a value belonging to a first value set; if the at least one time domain symbol refers to a time domain symbol determined by the network device for a terminal device in the second symbol set, setting, by the network device, the value on the second bit field to a value corresponding to the at least one time domain symbol; transmitting, by the network device, a control channel to the terminal device on a first time domain unit, where the control channel carries the resource indication information, the resource indication information includes a first bit field and the second bit field, the first bit field indicates the second time domain unit, and the second bit field indicates the at least time domain symbol; transmitting, by the network device, the data channel with the terminal device on the at least one time domain symbol in the second time domain unit.

Therefore, in the embodiments of the present application, the network device implicitly indicates to the terminal device a data channel resource used for transmitting a data channel, no matter which scheduling manner is used for scheduling the data channel resource, all the control channels used to schedule the data channel include the same channel structure to indicate the data channel resource, thereby effectively implementing resource scheduling and reducing the complexity of the blind detection of the terminal device.

In a possible implementation form, where the determining, by the network device, a value on the at least one time domain symbol to a value corresponding to the at least one time domain symbol includes: determining, by the network device, a value corresponding to symbol information according to the symbol information of the at least one time domain symbol, the symbol information including a position of a start-stop symbol in the at least one time domain symbol and/or a number of the at least one time domain symbol, and the start-stop symbol including a start time domain symbol and/or an end time domain symbol; setting, by the network device, the value on the second bit field to a value corresponding to the symbol information.

In a possible implementation form, if the symbol information includes the position of the start-stop symbol, the value on the second bit field represents a number of time domain symbols that separate the start-stop symbol from a reference symbol.

In a possible implementation form, the reference symbol includes any one of the following: a first time domain symbol in the first time domain unit; or a first reference symbol, where the first reference symbol is separated from a start time domain symbol or an end time domain symbol for transmitting the control channel by an integer number of time domain units, and the first reference symbol and the start-stop symbol are separated by less than one time domain unit; or a second reference symbol, where the second reference symbol is separated from a start time domain symbol or an end time domain symbol for transmitting a control resource set by an integer number of time domain units, and the second reference symbol and the start-stop symbol are separated by less than one time domain unit.

In a possible implementation form, if the at least one time domain symbol refers to a time domain symbol determined by the network device in the second symbol set for the terminal device, the method further includes: transmitting, by the network device, a reference signal with the terminal device on a start time domain symbol of the at least one time domain symbol or on a previous adjacent time domain symbol of the start time domain symbol.

In a possible implementation form, if the at least one time domain symbol refers to all time domain symbols in a first symbol set, the method further includes: transmitting, by the network device, a reference signal with the terminal device on a preset time domain symbol in the second time domain unit.

In a possible implementation form, the preset time domain symbol is a third time domain symbol or a fourth time domain symbol in the second time domain unit.

In a possible implementation form, a value on the first bit field represents a number of time domain units that separate the second time domain unit from the first time domain unit.

In a possible implementation form, the first symbol set is the same or different when frequency bands for transmitting the data channel are different.

In a possible implementation form, transmitting, by the network device, a control channel to the terminal device on a first time domain unit, includes: transmitting, by the network device, on the first time domain unit, downlink control information (DCI) that is carried in the control channel to the terminal device, where the DCI including the resource indication information.

In a possible implementation form, the time domain unit is a time slot or a subframe.

In a possible implementation form, the reference signal is a demodulation reference signal (DMRS).

In a third aspect, there is provided a terminal device which can perform operations of the terminal device according to any of the optional possible implementation manners of the first aspect or the above first aspect as such. Specifically, the terminal device may include a module unit for performing the operations of the terminal device according to any of the possible implementation manners of the first aspect or the above first aspect as such.

In a fourth aspect, there is provided a network device which can perform operations of the network device according to any of the optional implementation manners of the second aspect or the above second aspect as such. Specifically, the network device may include a module unit for performing the operations of the network device according to any of the possible implementation manners of the second aspect or the above second aspect as such.

In a fifth aspect, there is provided a terminal device, including: a processor, a transceiver and a memory. Where the processor, the transceiver and the memory communicate with each other through internal connection paths. The memory is configured to store instructions, and the processor is configured to execute the instructions stored in the memory. When the processor executes the instructions stored in the memory, the terminal device is enabled to perform the method according to any of the possible implementation manners of the first aspect or the first aspect as such, or the terminal device is enabled to implement the terminal device according to the third aspect.

In a sixth aspect, there is provided a network device, including: a processor, a transceiver and a memory. Where the processor, the transceiver and the memory communicate with each other through internal connection paths. The memory is configured to store instructions, and the processor is configured to execute the instructions stored in the memory. When the processor executes the instructions stored in the memory, the network device is enabled to perform the method according to any of the possible implementation manners of the second aspect or the second aspect as such, or the network device is enabled to implement the network device according to the fourth aspect.

In a seventh aspect, there is provided a computer readable storage medium storing a program, the program makes a terminal device perform any of the method for transmitting data according to the implementation forms of the first aspect or the above first aspect as such.

In an eighth aspect, there is provided a computer readable storage medium storing a program, the program makes a network device perform any of the method for transmitting data according to the implementation forms of the second aspect or the above second aspect as such.

In a ninth aspect, there is provided a system chip, including an input interface, an output interface, a processor and a memory. The processor is configured to execute instructions stored in the memory. When the instructions are executed, the processor can implement the method according to any of the possible implementation manners of the first aspect or the above first aspect as such.

In a tenth aspect, there is provided a system chip including an input interface, an output interface, a processor and a memory. The processor is configured to execute instructions stored in the memory. When the instructions are executed, the processor can implement the method according to any of the possible implementation manners of the second aspect or the above second aspect as such.

In an eleventh aspect, there is provided a computer program product including instructions, when the computer program product is operated on a computer, the computer is enabled to perform the method according to any of the possible implementation manners of the first aspect or the above first aspect as such.

In a twelfth aspect, there is provided a computer program product including instructions, when the computer program product is operated on a computer, the computer is enabled to perform the method according to any of the possible implementation manners of the second aspect or the above second aspect as such.

DESCRIPTION OF EMBODIMENTS

The technical solution in the embodiments of the present application will be described below with reference to the appended drawings.

It should be understood that the technical solution of the embodiment of the present application can be applied to various communication systems, such as a global system of mobile communication (GSM) system, a code division multiple access (CDMA) system, a wideband code division multiple access (WCDMA) system, a long term evolution (LTE) system, a LTE frequency division duplex (FDD) system, a LTE time division duplex (TDD) system, a universal mobile telecommunication system (UMTS), and a future 5G communication system.

The present application describes each embodiment with reference to the terminal device. The terminal device may refer to a user equipment (UE), an access terminal, a subscriber unit, a subscriber station, a mobile station, a remote station, a remote terminal, a mobile device, a user terminal, a terminal, a wireless communication device, a user agent or a user device. The access terminal may be a cellular phone, a cordless phone, a session initiation protocol (SIP) phone, a wireless local loop (WLL) station, a personal digital assistant (PDA), a handheld device with the a wireless communication function, a computing device or other processing devices connected to a wireless modem, a vehicle-mounted device, a wearable device, a terminal device in a future 5G network, or a terminal device in a future public land mobile network (PLMN), etc.

The present application describes the embodiments with reference to a network device. The network device may be a device for communicating with the terminal device, for example, may be a base transceiver station (BTS) in the GSM system or CDMA, or may be a NodeB (NB) in the WCDMA system, or may be an evolutional Node B, eNB or eNodeB in the LTE system, or the network device may be a relay station, an access point, a vehicle-mounted device, a wearable device, and a network side device in the future 5G network, or a network side device in the future evolutional PLMN network, etc.

Figure 1:
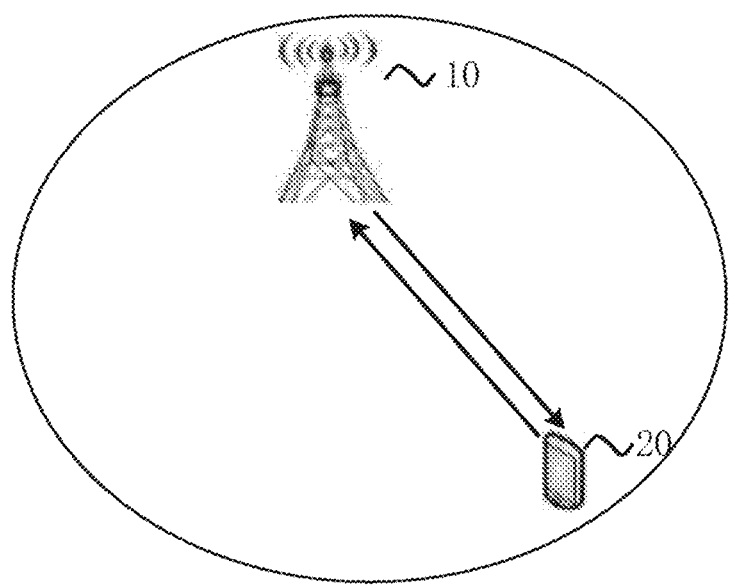
FIG. 1 is a schematic architecture diagram of an application scenario according to an embodiment of the present application.

FIG. 1 is a schematic diagram of an application scenario according to an embodiment of the present application. A communication system in FIG. 1 may include a network device 10 and a terminal device 20. The network device 10 is configured to provide communication services for the terminal device 20 and access a core network. The terminal device 20 can access the network by searching for a synchronization signal, a broadcast signal, and the like transmitted by the network device 10, thereby communicating with the network. Arrows shown in FIG. 1 may represent an uplink/downlink transmission through a cellular link between the terminal device 20 and the network device 10.

The network in the embodiments of the present application may refer to a public land mobile network (PLMN), or a device to device (D2D) network, or a machine to machine/man (M2M) network, or other networks. FIG. 1 is only an exemplary simplified schematic diagram. Other terminal devices may also be included in the network, which are not shown in FIG. 1.

Figure 2:
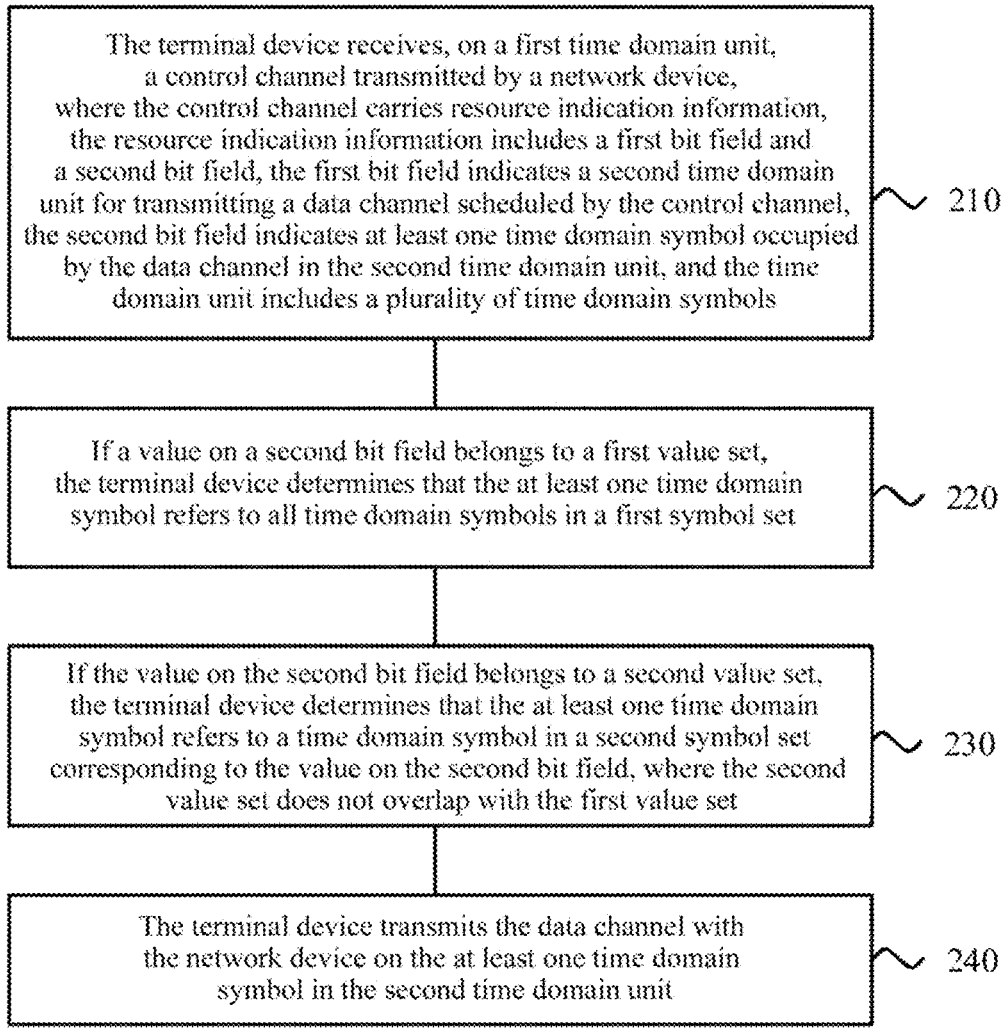
FIG. 2 is a schematic flowchart of a method for transmitting data according to an embodiment of the present application.

FIG. 2 is a schematic flowchart of a method for transmitting data according to an embodiment of the present application. The method shown in FIG. 2 can be performed by a terminal device which may be, for example, the terminal device 20 shown in FIG. 1. As shown in FIG. 2, the method for transmitting data includes:

In 210, the terminal device receives, on a first time domain unit, a control channel transmitted by a network device, where the control channel carries resource indication information.

Where the resource indication information includes a first bit field and a second bit field, the first bit field indicates a second time domain unit for transmitting a data channel scheduled by the control channel, the second bit field indicates at least one time domain symbol occupied by the data channel in the second time domain unit, and the time domain unit includes a plurality of time domain symbols.

Where the time domain unit may be, for example, a time slot or a subframe, each subframe includes two time slots, and each time domain unit includes a plurality of time domain symbols, such as orthogonal frequency division multiplexing (OFDM) symbols.

In an embodiment, in 210, where the terminal device receives, on a first time domain unit, a control channel transmitted by a network device includes: the terminal device receives, on the first time domain unit, downlink control information (DCI) which is transmitted by the network device and carried in the control channel, where the DCI including the resource indication information.

At present, the network device can schedule a data channel resource of the terminal device in two ways. One is to schedule the data channel resource of the terminal device based on the time slot. For example, this scheduling manner may be referred to as slot-based scheduling. In this case, each time domain unit includes a plurality of preset symbols for transmitting a data channel, for example, among seven symbols included in each time slot, the first three symbols are used to transmit a control channel and/or a reference signal, etc., and the transmission of the data channel starts from the $4^{th}$ symbol and can occupy the remaining symbols. Therefore, the network device only needs to notify the terminal device of the position of the time domain unit for transmitting the data channel. The other way is to schedule based on non-slot, which can also be referred to as, for example, non-slot-based scheduling. For the terminal device, since the time domain resource for transmitting the data channel can change flexibly, the network device can flexibly configure the data channel resource for the terminal device and indicate the data channel resource to the terminal device. In this case, the network device needs to indicate to the terminal device not only the position of the time domain unit for transmitting the data channel, but also which symbols in the time domain unit are used to transmit the data channel, for example, indicate to the terminal device a start symbol for transmitting the data channel and the number of the symbols.

For the former case described above, since the time domain symbols for transmitting the data channel in each time domain unit are specified, for example, the latter four symbols in each time slot are used for transmitting the data channel, while the first three symbols are used for transmitting the control channel. Therefore, when the network device performs resource indication for the terminal device, resource indication information in the control channel only needs to include one bit field for indicating the position of the time domain unit where the data channel scheduled by the control channel is located.

For the latter case described above, since the time domain symbol for transmitting the data channel in each time domain unit are not specified, but can be flexibly scheduled, when the network device performs the resource indication for the terminal device, the resource indication information in the control channel needs to include two bit fields, where one bit field indicates the position of the time domain unit where the data channel used by the data channel scheduled by the control channel is located, while the other bit field indicates which symbols in the time domain unit where the data channel is located are used to transmit the data channel.

Since the terminal device does not know which scheduling manner is used by the network device for scheduling the data channel resource, therefore, in the two scheduling manners, the lengths of the control channels for similarly scheduling the data channel are different, thus the complexity of blind detection for the control channel is higher.

In the embodiments of the present application, the network device implicitly indicates to the terminal device a data channel resource used for transmitting a data channel, no matter which scheduling manner is used for scheduling the data channel resource, all the control channels used to schedule the data channel include the same channel structure to indicate the data channel resource, thereby effectively implementing resource scheduling and reducing the complexity of the blind detection of the terminal device.

In 210, the network device transmits the control channel to the terminal device, on the first time domain unit, the terminal device receives the control channel, on the first time domain unit, where the control channel carries resource indication information, and the resource indication information includes a first bit field and second bit field.

Where the first bit field indicates the position of the time domain unit where the data channel scheduled by the control channel is located, and the second bit field indicates which symbols in the second time domain unit are used to transmit the data channel.

It can be understood that the first bit field is at a time domain unit level. For example, the first bit field indicates a data channel resource at the time slot level, which may be referred to as a Slot Field; the second bit field is at a symbol level, which may be referred to as a Symbol Field.

In an embodiment, a value on the first bit field represents the number of time domain units that separate the second time domain unit from the first time domain unit.

Specifically, the terminal device may determine the position of the second time domain unit relative to the first time domain unit according to the value on the first bit field, thereby determining the position of the second time domain unit for transmitting the data channel. For example, assume that both the first bit field and the second bit field include three bits, the terminal device receives the control channel on a time domain unit 1, if the value on the first bit field in the resource indication information carried by the control channel is 010, the terminal device can know that the second time domain unit for transmitting the data channel and the time domain unit 1 are separated by two time domain symbols, and then determine that the second time domain unit refers to a time domain unit 3; if the value on the first bit field in the resource indication information carried by the control channel is 001, the terminal device can know that the second time domain unit for transmitting the data channel and the time domain unit 1 are separated by one time domain symbol, and then determine that the second time domain unit refers to a time domain unit 2.

The terminal device determines the position of the second time domain unit and also needs to determine which symbols in the second time domain unit are specifically used to transmit the data channel. The following describes in detail, with reference to 220 and 230, how the terminal device determines the at least one time domain symbol for transmitting the data channel according to the resource indication information.

In 220, if a value on the second bit field belongs to a first value set, the terminal device determines that the at least one time domain symbol refers to all time domain symbols in a first symbol set.

In an embodiment, if frequency bands for transmitting the data channel are different, the first symbol set may be the same or the first symbol sets may be different.

In 230, if the value on the second bit field belongs to a second value set, the terminal device determines that the at least one time domain symbol refers to a time domain symbol in a second symbol set corresponding to the value on the second bit field.

Where the second value set does not overlap with the first value set.

Specifically, if the value on the second bit field is a value in the first value set, the terminal device may determine that the at least one time domain symbol in the second time domain unit used for transmitting the data channel refers to all time domain symbols in the first symbol set. The first symbol set may be, for example, a plurality of symbols agreed previously between the terminal device and the network device, for example, written into a protocol. The terminal device and the network device may agree which symbols in a time domain unit may be used to transmit the data channel. The first symbol set may be part of the time domain symbols in a time domain unit, such as the latter few time domain symbols, while the first few symbols in the time domain unit may be used to transmit the control channel or other signals.

It can be understood that the resource scheduling manner used by the network device in 220 is equivalent to non-slot-based scheduling. The resource scheduling manner used by the network device in 230 is equivalent to slot-based scheduling.

If the value on the second bit field is a value in the second value set, the terminal device needs to determine the at least one time domain symbol for transmitting the data channel in the second time domain unit according to the value on the second bit field. The at least one time domain symbol refers to a time domain symbol in the second symbol set corresponding to the value on the second bit field.

It should be understood that the first value set may include only one value, and may also include a plurality of values, which are not limited herein, as long as the first value set is different from the second value set. If the first value set includes only one value, when the value on the second bit field is equal to this value, the terminal device may transmit a data channel to the network device, or receive a data channel transmitted by the network device, on all time domain symbols in the first time domain symbol set; if the first value set includes a plurality of values, when the value on the second bit field is equal to any one of the plurality of values, the terminal device may transmit a data channel to the network device, or receive a data channel transmitted by the network device, on all time domain symbols in the first time domain symbol set.

In an embodiment, 230 may include 231 and 232.

In 231, the terminal device determines symbol information corresponding to the value on the second bit field according to the value on the second bit field.

Where the symbol information includes a position of a start-stop symbol in the at least one time domain symbol and/or the number of the at least one time domain symbol, and the start-stop symbol includes a start time domain symbol and/or an end time domain symbol.

In 232, the terminal device determines the at least one time domain symbol in the second symbol set according to the symbol information.

Specifically, the terminal device may determine, according to the value on the second bit field and a mapping relationship between a plurality of values in the second data set and a plurality of items of symbol information, the symbol information corresponding to the value on the second bit field, and determine, according to the symbol information, the at least one time domain symbol for transmitting the data channel in the second symbol set.

The symbol information may include the position of the start-stop symbol in the at least one time domain symbol for transmitting the data channel and/or the number of symbols, and the start-stop symbol may be the start time domain symbol (i.e., the first symbol for transmitting the data channel in the second time domain unit) and/or the end time domain symbol (i.e., the last time domain symbol for transmitting the data channel in the second time domain unit). The terminal device may determine the time domain symbol for transmitting the data channel in the second symbol set according to these symbol information.

In an embodiment, if the symbol information includes the position of the start-stop symbol, the value on the second bit field represents the number of time domain symbols that separate the start-stop symbol from a reference symbol.

In an embodiment, if the symbol information includes the position of the start-stop symbol, the value on the second bit field represents a number of time domain symbols that separate the start-stop symbol from the reference symbol.

Where, In an embodiment, the reference symbol is any one of the following: a first time domain symbol in the first time domain unit; a first reference symbol, where the first reference symbol is separated from a start time domain symbol or an end time domain symbol for transmitting the control channel by an integer number of time domain units, and the first reference symbol and the start-stop symbol are separated by less than one time domain unit; a second reference symbol, where the second reference symbol is separated from a start time domain symbol or an end time domain symbol for transmitting a control resource set by an integer number of time domain units, and the second reference symbol and the start-stop symbol are separated by less than one time domain unit.

Here, a control resource set (CORESET) is a preset time domain resource for transmitting the control channel, all terminal devices detect their own control channels in this control resource set, and the control channel resources used by control channels of different terminal devices may be different, but all belong to this control resource set. In the embodiments of the present application, the reference symbol may be determined based on a time domain start position or a time domain end position of the control resource set, or based on a start position or an end position of the time domain resource occupied by the control channel of the terminal device.

During reference symbol determination, in order to reduce bit overheads, counting an integer number of time domain units backwards from the start symbol or from the end symbol of the control channel resource, such that the first reference symbol is separated from the start time domain symbol or the end time domain symbol for transmitting the control channel by the integer number of time domain units, and is separated from the start-stop symbol for transmitting the data channel by less than one time domain unit; or counting an integer number of time domain units backwards from a start time domain symbol or an end time domain symbol of the control resource set, such that the second reference symbol is separated from the start time domain symbol or the end time domain symbol of the control resource set by the integer number of time domain units, and is separated from the start-stop symbol for transmitting the data channel by less than one time domain unit.

In 240, the terminal device transmits the data channel with the network device on the at least one time domain symbol in the second time domain unit.

Therefore, in the embodiments of the present application, the terminal device determines, according to an implicit indication of the network device, a data channel resource used for transmitting the data channel, and no matter which scheduling manner is used for scheduling the data channel resource, all the control channels used to schedule the data channel include the same channel structure to indicate the data channel resource, thereby effectively implementing resource scheduling and reducing the complexity of the blind detection of the terminal device.

Figure 4:
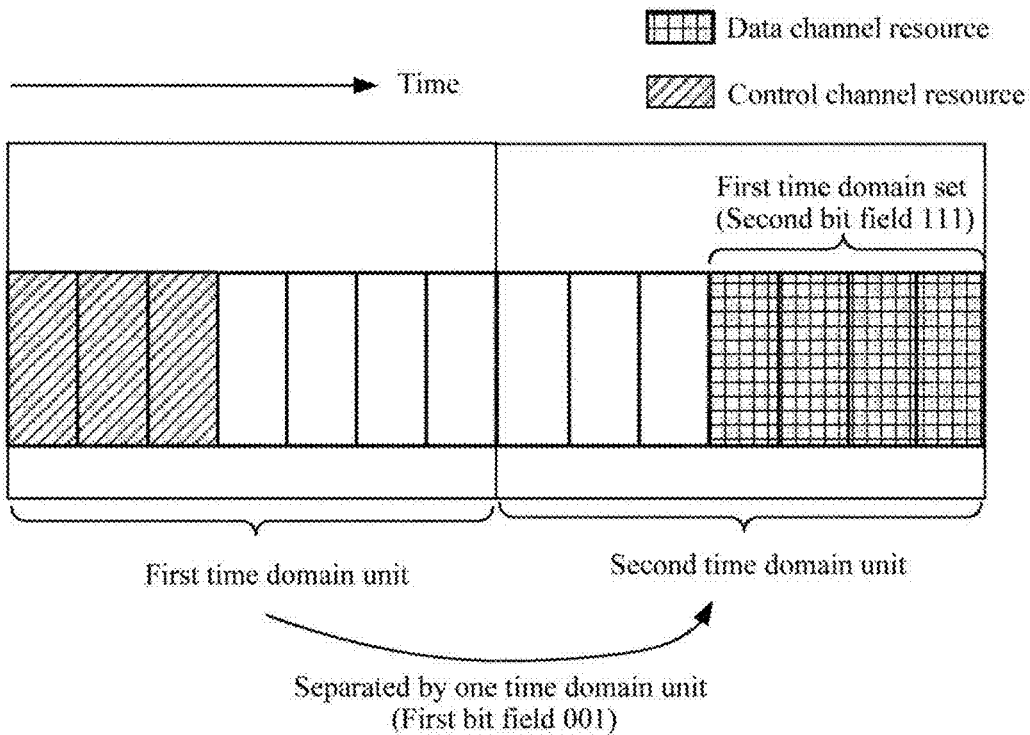
FIG. 4 is a schematic diagram of a data channel resource according to an embodiment of the present application.

For example, as shown in FIG. 4, assume that the value on the second bit field represents the time domain start symbol for transmitting a data channel, the second bit field includes three bits, different values in the second bit field correspond to different symbol information, the symbol information is a position of the start time domain symbol in the at least one time domain symbol for transmitting the data channel, the reference symbol is the first time domain symbol in the first time domain unit for transmitting a control channel, and there is one time slot (including seven symbols) that separates the first reference symbol from the first symbol for transmitting the control channel. In Table I, the second symbol set includes all time domain symbols in a time slot, i.e., {Symbol 0, Symbol 1, Symbol 2, Symbol 3, Symbol 4, Symbol 5, Symbol 6}, and the first symbol set is {Symbol 3, Symbol 4, Symbol 5, Symbol 6}. As shown in Table I, the second value set is {000, 001, 010, 011, 100, 101, 110}, and the first value set is {111}. When the value on the second bit field is 000, the start time domain symbol for transmitting the data channel is the first reference symbol; when the value on the second bit field is 001, the start time domain symbol is the first symbol after the first reference symbol, or the start time domain symbol and the first reference symbol are separated by one time domain symbol; when the value on the second bit field is 010, the start time domain symbol is the second symbol after the first reference symbol, or the start time domain symbol and the first reference symbol are separated by two time domain symbols; when the value on the second bit field is 011, the start time domain symbol is the third symbol after the first reference symbol, or the start time domain symbol and the first reference symbol are separated by three time domain symbols; when the value on the second bit field is 100, the start time domain symbol is the fourth symbol after the first reference symbol, or the start time domain symbol and the first reference symbol are separated by four time domain symbols; when the value on the second bit field is 101, the start time domain symbol is the fifth symbol after the first reference symbol, or the start time domain symbol and the first reference are separated by five time domain symbols; when the value on the second bit field is 110, the start time domain symbol is the sixth symbol after the first reference symbol, or the start time domain symbol and the first reference symbol are separated by six time domain symbols. When the value on the second bit field is 111, the terminal device may determine that the at least one time domain symbol for transmitting the data channel refers to all time domain symbols in the first symbol set.

TABLE I

| The second bit field | Start time domain symbol for transmitting the data channel |
| --- | --- |
| 000 | The start time domain is the first reference symbol |
| 001 | The first symbol after the first reference symbol |
| 010 | The second symbol after the first reference symbol |
| 011 | The third symbol after the first reference symbol |
| 100 | The fourth symbol after the first reference symbol |
| 101 | The fifth symbol after the first reference symbol |
| 110 | The sixth symbol after the first reference symbol |
| 111 | All the time domain symbols in the first symbol set are used for transmitting the data channel |

Figure 3:
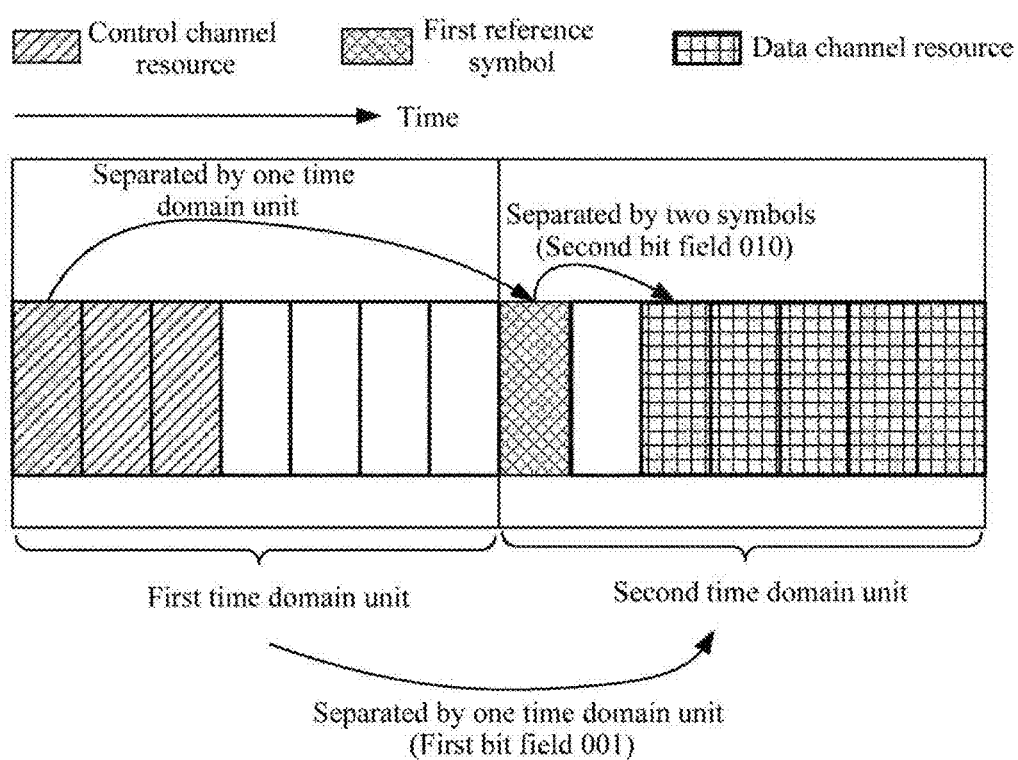
FIG. 3 is a schematic diagram of a data channel resource according to an embodiment of the present application.

For example, data channel resources shown in FIG. 3, based on Table I, assume that the value on the first bit field is 001, indicating that the second time domain unit and the first time domain unit are separated by one time domain unit (assume that one time domain unit is one time slot, if the first time domain unit is Time Slot 1, then the second time domain unit is Time Slot 2). The value on the second bit field is 010, indicating that the start time domain symbol for transmitting the data channel and the first reference symbol are separated by two time domain symbols. Here, as shown in FIG. 3, the position of the first reference symbol and the start position of the control channel resources are separated by one time domain unit, and the first reference symbol and the start time domain symbol of the data channel are separated by two time domains symbols.

For another example, data channel resources shown in FIG. 4, based on Table I, assume that the value on the first bit field is 000, indicating that the second time domain unit is the next time domain unit of the first time domain unit. The value on the second bit field is 111, indicating that all time domain symbols in the first symbol set are used to transmit the data channel, and the first symbol set is {Symbol 3, Symbol 4, Symbol 5, Symbol 6}.

As shown in Table II, assume that the start time domain symbol of the data channel transmission can be Symbol 0, Symbol 3 or Symbol 6 in one time slot, and the second bit field includes two bits. The second value set is {00, 01, 10}, the first value set is {11}, the second symbol set is {Symbol 0, Symbol 3 and Symbol 6}, and the first symbol set is {Symbol 3, Symbol 4, Symbol 5, Symbol 6}. As shown in Table II, when the value on the second bit field is 00, the start time domain symbol is Symbol 0 in the second time domain unit; when the value on the second bit field is 01, the start time domain symbol is Symbol 3 in the second time domain unit; when the value on the second bit field is 10, the start time domain symbol is Symbol 6 in the second time domain unit; when the value on the second bit field is 11, the terminal device may determine that the at least one time domain symbol for transmitting the data channel refers to all time domain symbols in the first symbol set.

TABLE II

| The second bit field | Start time domain symbol for transmitting the data channel |
|---|---|
| 00 | Symbol 0 |
| 01 | Symbol 3 |
| 10 | Symbol 6 |
| 11 | All time domain symbols in the first symbol set are used for transmitting the data channel |

Figure 5:
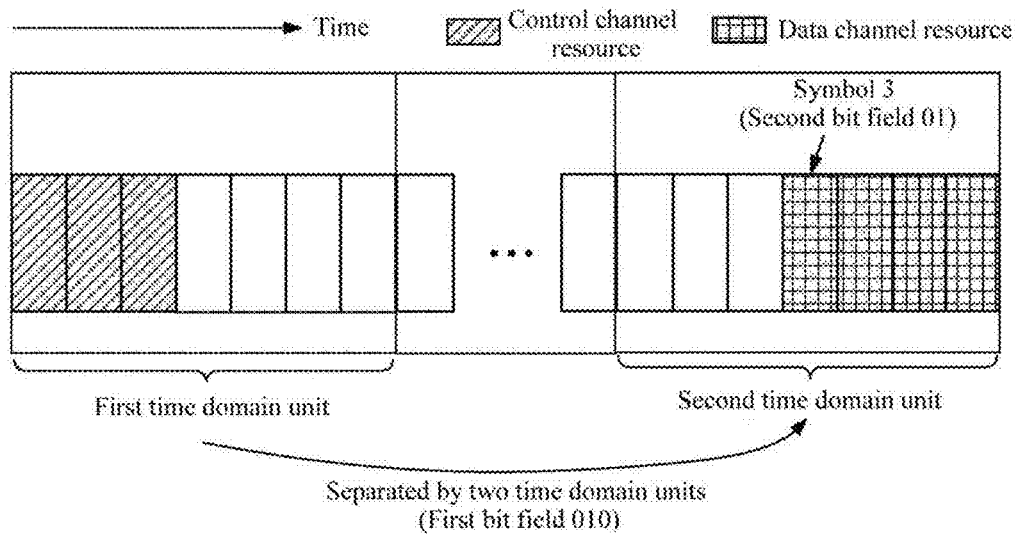
FIG. 5 is a schematic diagram of a data channel resource according to an embodiment of the present application.

For example, data channel resources shown in FIG. 5, based on Table II, assume that the value on the first bit field is 010, indicating that the second time domain unit and the first time domain unit are separated by two time domain units. The value on the second bit field is 01, indicating that the start time domain symbol for transmitting the data channel is Symbol 3 in the second time domain unit, and the data channel resource occupies Symbol 3 to Symbol 6 in the second time domain unit.

It should be understood that, after receiving the control channel on the first time domain unit (which is assumed as Time Slot 1), the terminal device can determine, according to the value on the first bit field in one item of resource indication information carried in the control channel, the position (which is assumed as Time Slot 2) of the second time domain unit where the data channel scheduled by the control channel is located, and can determine, according to the value on the second bit field, a position of the at least one time domain symbol for transmitting the data channel in the second time domain unit (the start domain symbol is the symbol 3), then the terminal device may know that the start time domain symbol for transmitting the data channel is Symbol 6 in Time Slot 2. In this case, In an embodiment, the control channel received by the terminal device may further carry another item of resource indication information, and the another item of resource indication information may also include two bit fields, that is, a first bit field and a second bit field. Where the value on the first bit field indicates that the data channel resource scheduled by the control channel is located in Time Slot 3, and the value in the second bit field indicates that the position of the end time domain symbol of the at least one time domain symbol is Symbol 3, then the terminal device can know that the end time domain symbol for transmitting the data channel is Symbol 3 in Time Slot 3 according to the another item of resource indication information. Therefore, the terminal device can determine, with reference to the above two items of resource indication information, that the time domain resource for transmitting the data channel starts from Symbol 6 of Time Slot 2 and ends at Symbol 3 of Time Slot 3.

In another case, if the terminal device determines, according to the first bit field and the second bit field in the resource indication information, that the start time domain symbol of the at least one time domain symbol is Symbol 6 in Time Slot 2, and determines, according to the first bit field and the second bit field in another item of resource indication information, that the number of the at least one time domain symbol is 5 (in this case, the value on the second bit field in another item of resource indication information indicates the number of the at least one time domain symbol for transmitting the data channel). Then, the terminal device may also determine, with reference to these two items of resource indication information, that the time domain resource used for transmitting the data channel starts from Symbol 6 in Time Slot 2 and ends at Symbol 3 in Time Slot 3, which are not limited by the embodiment of the present application.

In the embodiments of the present application, In an embodiment, if the value on the second bit field belongs to the second value set, the method further includes: the terminal device transmits a reference signal with the network device on a start time domain symbol of the at least one time domain symbol or on a previous adjacent time domain symbol of the start time domain symbol.

In an embodiment, if the value on the second bit field belongs to the first value set, the method further includes: the terminal device transmits a reference signal with the network device on a preset time domain symbol in the second time domain unit.

Figure 6:
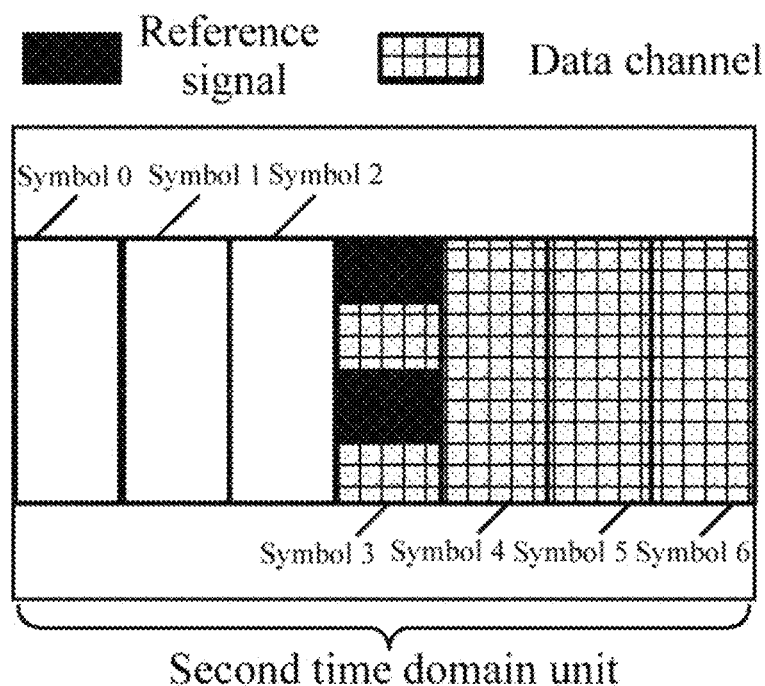
FIG. 6 is a schematic flowchart of reference signal resources according to an embodiment of the present application.

If the value on the second bit field belongs to the second value set, or the network device uses a non-slot based scheduling manner, the reference signal for demodulating the data channel may be transmitted on the first time domain symbol of the at least one symbol for transmitting the data channel, where the reference signal and the data channel can occupy different frequency domain resources on the first time domain symbol. For example, the reference signal resource shown in FIG. 6, the start symbol of the data channel is Symbol 3, and the reference signal can transmit the reference signal on Symbol 3 using different frequency domain resources.

Figure 7:
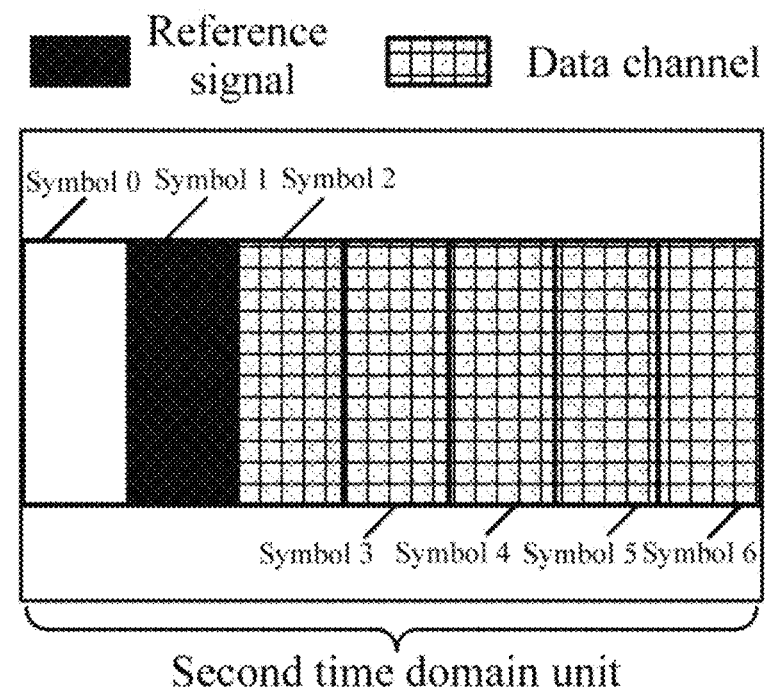
FIG. 7 is a schematic diagram of reference signal resources according to an embodiment of the present application.

In an embodiment, the terminal device may transmit the reference signal on a previous adjacent time domain symbol of the first time domain symbol of the data channel. For example, the reference signal resource shown in FIG. 7, the start symbol of the data channel is Symbol 2, and the terminal device can transmit the reference signal on the previous symbol (i.e., Symbol 1) of Symbol 2.

Figure 8:
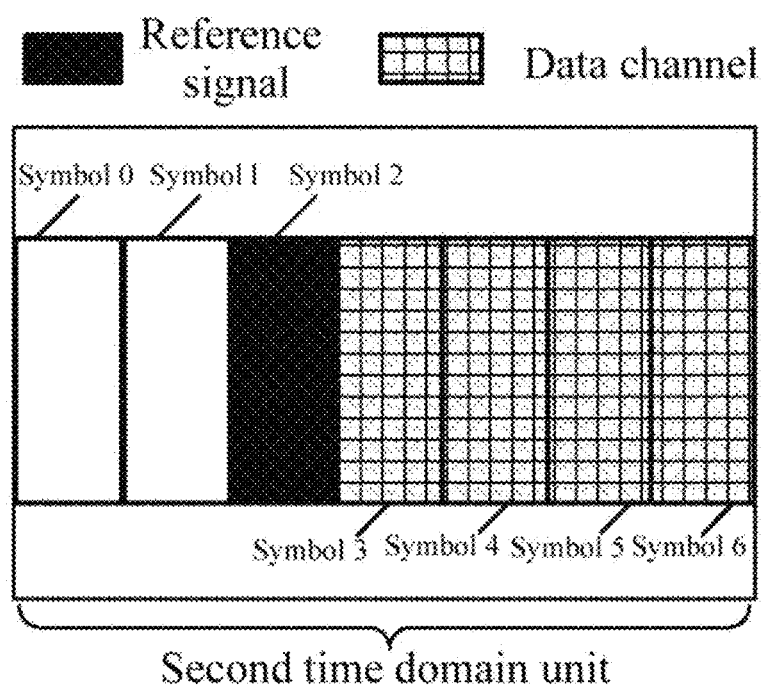
FIG. 8 is a schematic diagram of reference signal resources according to an embodiment of the present application.

If the value on the second bit field belongs to the first value set, or the network device uses a slot-based scheduling manner, the reference signal for demodulating the data channel may be transmitted on the preset time domain symbol in the second time domain unit for transmitting the data channel. For example, the reference signal resource shown in FIG. 8, and the reference symbol is agreed to be transmitted on the third time domain symbol (i.e., Symbol 2) in the second time domain unit.

Where the reference signal may be an uplink reference signal or a downlink reference signal. In an embodiment, the reference signal is a DeModulation Reference Signal (DMRS).

Figure 9:
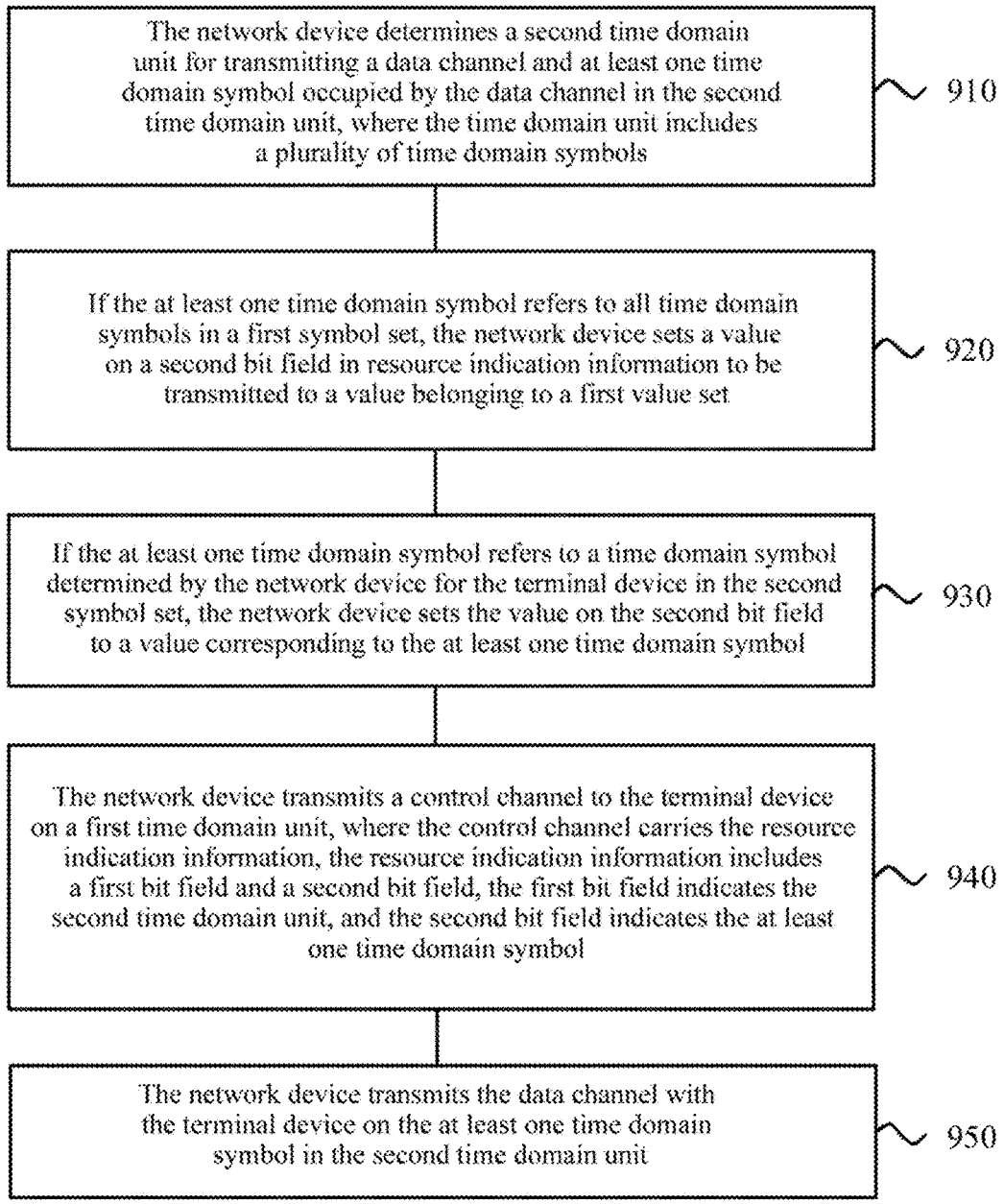
FIG. 9 is a schematic diagram of a method for transmitting data according to an embodiment of the present application.

FIG. 9 is a schematic flowchart of a method for transmitting data according to an embodiment of the present application. The method illustrated in FIG. 9 may be performed by a network device, such as the network device 10 shown in FIG. 1. As shown in FIG. 9, the method for transmitting data includes:

In 910, the network device determines a second time domain unit for transmitting a data channel and at least one time domain symbol occupied by the data channel in the second time domain unit.

Where one time domain unit includes a plurality of time domain symbols.

In an embodiment, the time domain unit is a time slot or a subframe.

In an embodiment, where the network device transmits a control channel to a terminal device on a first time domain unit includes: the network device transmits, on the first time domain unit, downlink control information (DCI) that is carried in the control channel to the terminal device, where the DCI including the resource indication information.

In 920, if the at least one time domain symbol refers to all time domain symbols in a first symbol set, the network device sets a value on a second bit field in resource indication information to be transmitted to a value belonging to a first value set.

In an embodiment, if frequency bands for transmitting the data channel are different, the first symbol set is the same or the first symbol sets are different.

In 930, if the at least one time domain symbol refers to a time domain symbol determined by the network device for the terminal device in the second symbol set, the network device sets the value on the second bit field to a value corresponding to the at least one time domain symbol.

In 940, the network device transmits a control channel to the terminal device on a first time domain unit, where the control channel carries the resource indication information, the resource indication information includes a first bit field and the second a bit field, the first bit field indicates the second time domain unit, and the second bit field indicates the at least one time domain symbol.

In an embodiment, the value on the first bit field represents the number of time domain units that separate the second time domain unit from the first time domain unit.

In 950, the network device transmits the data channel with the terminal device on the at least one time domain symbol in the second time domain unit.

Specifically, when the network device indicates a data channel resource to the terminal device, the first bit field and the second bit field can be used for indication. The network device determines the value on the first bit field based on the position of the second time domain unit where the data channel resource is located; the value on the second bit field is determined based on which symbols in the second time domain unit are specifically occupied by the data channel resource. When adopting the slot-based scheduling manner, the network device directly sets the value on the second bit field to any value in the first value set, thereby implicitly notifying the terminal device that all time domain symbols in the first symbol set are used for transmitting the control channel, and the first symbol set may be, for example, some of the symbols in the time domain unit agreed in the protocol, such as Symbol 3 to Symbol 9. When adopting the non-slot-based scheduling manner, the network device sets, according to the position in the second time domain unit of the at least one symbol used by the data channel scheduled for the terminal device, the value on the second bit field to a value corresponding to this symbol.

Therefore, in the embodiments of the present application, the network device implicitly indicates to the terminal device a data channel resource used for transmitting a data channel, no matter which scheduling manner is used for scheduling the data channel resource, all the control channels used to schedule the data channel include the same channel structure to indicate the data channel resource, thereby effectively implementing resource scheduling and reducing the complexity of the blind detection of the terminal device.

In an embodiment, where the network device sets the value on the second bit field to a value corresponding to the at least one time domain symbol includes: the network device determines a value corresponding to symbol information according to the symbol information of the at least one time domain symbol, where the symbol information including a position of a start-stop symbol in the at least one time domain symbol and/or a number of the at least one time domain symbol, and the start-stop symbol including a start time domain symbol and/or an end time domain symbol; the network device sets the value on the second bit field to a value corresponding to the symbol information.

In an embodiment, if the symbol information includes the position of the start-stop symbol, the value on the second bit field represents a number of time domain symbols that separate the start-stop symbol from the reference symbol.

In an embodiment, the reference symbol includes any one of the following: a first time domain symbol in the first time domain unit; or a first reference symbol, where the first reference symbol is separated from a start time domain symbol or an end time domain symbol for transmitting the control channel by an integer number of time domain units, and the first reference symbol and the start-stop symbol are separated by less than one time domain unit; or a second reference symbol, where the second reference symbol is separated from a start time domain symbol or an end time domain symbol for transmitting a control resource set by an integer number of time domain units, and the second reference symbol and the start-stop symbol are separated by less than one time domain unit.

In an embodiment, if the at least one time domain symbol refers to a time domain symbol determined by the network device in the second symbol set for the terminal device, the method further includes: the network device transmits a reference signal with the terminal device on a start time domain symbol of the at least one time domain symbol or on a previous adjacent time domain symbol of the start time domain symbol.

For example, the network device may determine the value on the first bit field according to a position (e.g., the number of time domain units that separate the second time domain unit from the first time domain unit for transmitting the control channel) of the second time domain unit for transmitting the data channel scheduled for the terminal device; and may determine the value on the second bit field according to Table I and the specific position of the symbol for transmitting the data channel scheduled by the terminal device.

In an embodiment, if the at least one time domain symbol refers to all time domain symbols in the first symbol set, the method further includes: the network device transmits a reference signal with the terminal device on a preset time domain symbol in the second time domain unit.

In an embodiment, the preset time domain symbol is a third time domain symbol or a fourth time domain symbol in the second time domain unit.

In an embodiment, the reference signal is a demodulation reference signal (DMRS).

It should be understood that reference may be made to the related description of the terminal device in FIG. 2 to FIG. 8 for the process that the network device determines the resource indication information, which will not be repeated herein for brevity.

It should also be understood that, in each embodiment of the present application, the sequence number of above each process does not represent the order of execution, and the order of execution of each process should be subject to its function and internal logic, and should not be taken in a limiting sense for the implementation process of the embodiment of the present application.

Figure 10:
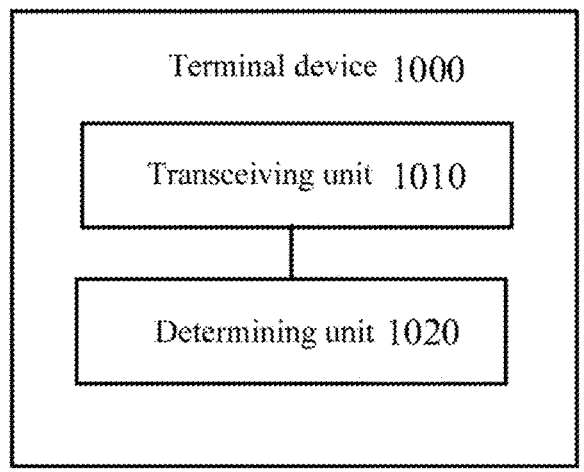
FIG. 10 is a schematic structural diagram of a terminal device according to an embodiment of the present application.

FIG. 10 is a schematic structural diagram of a terminal device 1000 according to an embodiment of the present application. As shown in FIG. 10, the terminal device 1000 includes a transceiving unit 1010 and a determining unit 1020, where:

the transceiving unit 1010 is configured to receive, on the first time domain unit, a control channel transmitted by a network device, where the control channel carries resource indication information, the resource indication information includes a first bit field and a second bit field, the first bit field indicates a second time domain unit for transmitting a data channel scheduled by the control channel, and the time domain unit includes a plurality of time domain symbols;

the determining unit 1020 is configured to: if the value on the second bit field belongs to the first value set, determine that the at least one time domain symbol refers to all time domain symbols in a first symbol set;

the determining unit 1020 is further configured to: if the value on the second bit field belongs to the second value set, determine that the at least one time domain symbol refers to a time domain symbol in a second symbol set corresponding to the value on the second bit field, where the second value set does not overlap with the first value set;

the transceiving unit 1010 is further configured to transmit the data channel with the network device on the at least one time domain symbol in the second time domain unit.

Therefore, in the embodiments of the present application, the terminal device determines, according to an implicit indication of the network device, a data channel resource used for transmitting the data channel, and no matter which scheduling manner is used for scheduling the data channel resource, all the control channels used to schedule the data channel include the same channel structure to indicate the data channel resource, thereby effectively implementing resource scheduling and reducing the complexity of the blind detection of the terminal device.

In an embodiment, the determining unit 1020 is specifically configured to: determine symbol information corresponding to the value on the second bit field according to the value on the second bit field, where the symbol information includes a position of a start-stop symbol in the at least one time domain symbol and/or a number of the at least one time domain symbol, and the start-stop symbol includes a start time domain symbol and/or an end time domain symbol; determine the at least one time domain symbol in the second symbol set according to the symbol information.

In an embodiment, if the symbol information includes the position of the start-stop symbol, the value on the second bit field represents a number of time domain symbols that separate the start-stop symbol from a reference symbol.

In an embodiment, the reference symbol includes: a first time domain symbol in the first time domain unit; a first reference symbol, where the first reference symbol is separated from a start time domain symbol or an end time domain symbol for transmitting the control channel by an integer number of time domain units, and the first reference symbol and the start-stop symbol are separated by less than one time domain unit; a second reference symbol, where the second reference symbol is separated from a start time domain symbol or an end time domain symbol for transmitting a control resource set by an integer number of time domain units, and the second reference symbol and the start-stop symbol are separated less than one time domain unit.

In an embodiment, if the value on the second bit field belongs to the second value set, the transceiving unit 1010 is further configured to: transmit a reference signal with the network device on the start time domain symbol of the at least one time domain symbol, or on the previous adjacent time domain symbol of the start time domain symbol.

In an embodiment, if the value on the second bit field belongs to the first value set, the transceiving unit 1010 is further configured to: transmit a reference signal with the network device on a preset time domain symbol in the second time domain unit.

In an embodiment, the preset time domain symbol is a third time domain symbol or a fourth time domain symbol in the second time domain unit.

In an embodiment, a value on the first bit field represents a number of time domain units that separate the second time domain unit from the first time domain unit.

In an embodiment, if frequency bands for transmitting the data channel are different, the first symbol set is the same or the first symbol sets are different.

In an embodiment, the transceiving unit 1010 is specifically configured to: receive, on the first time domain unit, downlink control information (DCI) which is transmitted by the network device and carried in the control channel, where the DCI including the resource indication information.

In an embodiment, the time domain unit is a time slot or a subframe.

In an embodiment, the reference signal is a demodulation reference signal (DMRS).

Figure 11:
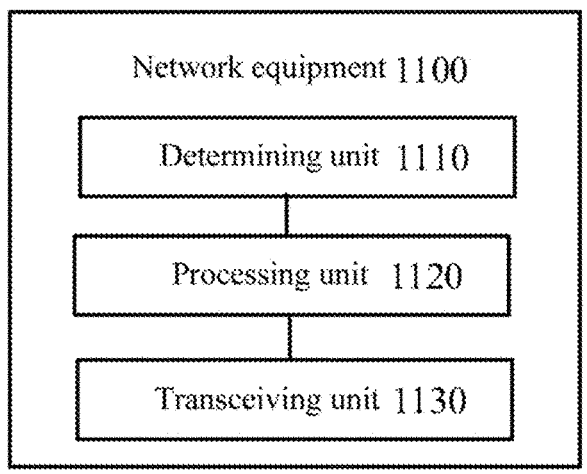
FIG. 11 is a schematic structural diagram of a network device according to an embodiment of the present application.

FIG. 11 is a schematic structural diagram of a network device 1100 according to an embodiment of the present application. As shown in FIG. 11, the network device 1100 includes a determining unit 1110, a processing unit 1120 and a transceiving unit 1130, where:

the determining unit 1110 is configured to determine a second time domain unit for transmitting a data channel and at least one time domain symbol for transmitting the data channel in the second time domain unit, where the time domain unit including a plurality of time domain symbols;

the processing unit 1120 is configured to: if the at least one time domain symbol refers to all time domain symbols in a first symbol set, set a value on a second bit field in the resource indication information to be transmitted to a value of a first value set;

the processing unit 1120 is further configured to: if the at least one time domain symbol refers to a time domain symbol determined by the network device in the second symbol set for a terminal device, set the value on the second bit field to a value corresponding to the at least one time domain symbol;

the transceiving unit 1130 is further configured to transmit, a control channel to the terminal device on a first time domain unit, where the control channel carries the resource indication information, the resource indication information includes a first bit field and the first a second bit field, the first bit field indicates the second time domain unit, and the second bit field indicates the at least one time domain symbol;

the transceiving unit 1130 is further configured to transmit the data channel with the terminal device on the at least one time domain symbol in the second time domain unit.

Therefore, in the embodiments of the present application, the network device implicitly indicates to the terminal device a data channel resource used for transmitting a data channel, no matter which scheduling manner is used for scheduling the data channel resource, all the control channels used to schedule the data channel include the same channel structure to indicate the data channel resource, thereby effectively implementing resource scheduling and reducing the complexity of the blind detection of the terminal device.

In an embodiment, the processing unit 1120 is specifically configured to: determine a value corresponding to symbol information according to the symbol information of the at least one time domain symbol, where the symbol information includes a position of a start-stop symbol in the at least one time domain symbol and/or a number of the at least one time domain symbol, and the start-stop symbol includes a start time domain symbol and/or an end time domain symbol; set the value on the second bit field to a value corresponding to the symbol information.

In an embodiment, if the symbol information includes the position of the start-stop symbol, the value on the second bit field represents a number of time domain symbols that separate the start-stop symbol from a reference symbol.

In an embodiment, the reference symbol includes any one of the following: a first time domain symbol in the first time domain unit; or a first reference symbol, where the first reference symbol is separated from a start time domain symbol or an end time domain symbol for transmitting the control channel by an integer number of time domain units, and the first reference symbol and the start-stop symbol are separated by less than one time domain unit; or a second reference symbol, where the second reference symbol is separated from a start time domain symbol or an end time domain symbol for transmitting a control resource set by an integer number of time domain units, and the second reference symbol and the start-stop symbol are separated by less than one time domain unit.

In an embodiment, if the at least one time domain symbol refers to a time domain symbol determined by the network device in the second symbol set for the terminal device, the transceiving unit 1130 is further configured to: transmit a reference signal with the terminal device on a start time domain symbol of the at least one time domain symbol or on a previous adjacent time domain symbol of the start time domain symbol.

In an embodiment, if the at least one time domain symbol refers to all time domain symbols in a first symbol set, the transceiving unit 1130 is further configured to: transmit a reference signal with the terminal device on a preset time domain symbol in the second time domain unit.

In an embodiment, the preset time domain symbol is a third time domain symbol or a fourth time domain symbol in the second time domain unit.

In an embodiment, a value on the first bit field represents a number of time domain units that separate the second time domain unit from the first time domain unit.

In an embodiment, the first symbol set is the same or different when frequency bands for transmitting the data channel are different.

In an embodiment, the transceiving unit 1130 is configured to: transmit, on the first time domain unit, downlink control information (DCI) that is carried in the control channel to the terminal device, where the DCI including the resource indication information.

In an embodiment, the time domain unit is a time slot or a subframe.

In an embodiment, the reference signal is a demodulation reference signal (DMRS).

Figure 12:
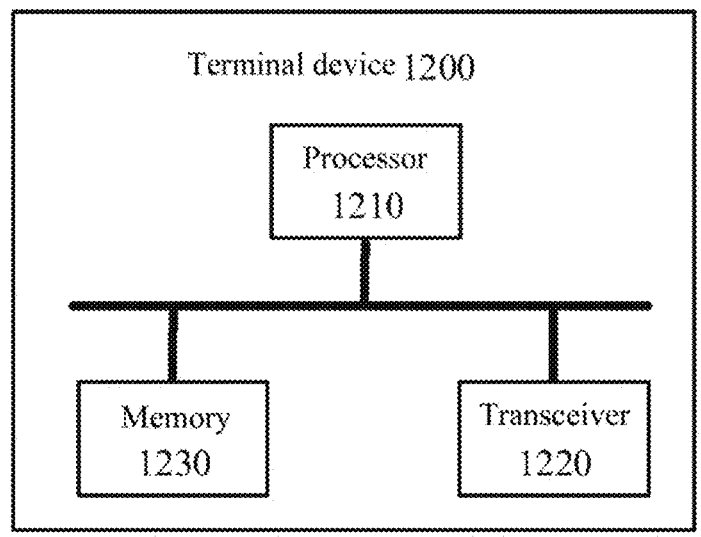
FIG. 12 is a schematic structural diagram of a terminal device according to an embodiment of the present application.

FIG. 12 is a schematic structural diagram of a terminal device 1200 according to an embodiment of the present application. As shown in FIG. 12, the terminal device includes a processor 1210, a transceiver 1220 and a memory 1230, and the processor 1210, the transceiver 1220 and the memory 1230 communicate with each other through internal connection paths. The memory 1230 is configured to store instructions, the processor 1210 is configured to execute the instructions stored in the memory 1230, to control the transceiver 1220 to receive signals or transmit signals. Where, the transceiver 1220 is configured to:

receive, on a first time domain unit, a control channel transmitted by a network device, where the control channel carries resource indication information, the resource indication information includes a first bit field and a second bit field, the first bit field indicates a second time domain unit for transmitting a data channel scheduled by the control channel, the second bit field indicates at least one time domain symbol for transmitting the data channel in the second time domain unit, and the time domain unit includes a plurality of time domain symbols;

the processor 1210 is configured to: if a value on the second bit field belongs to the first value set, determine that the at least one time domain symbol refers to all time domain symbols in a first symbol set; if the value on the second bit field belongs to a second value set, determine that the at least one time domain symbol refers to a time domain symbol in a second symbol set corresponding to the value on the second bit field, where the second value set does not overlap with the first value set;

the transceiver 1220 is further configured to transmit the data channel with the network device on the at least one time domain symbol in the second time domain unit.

In an embodiment, the processor 1210 is specifically configured to: determine symbol information corresponding to the value on the second bit field according to the value on the second bit field, where the symbol information including a position of a start-stop symbol in the at least one time domain symbol and/or a number of the at least one time domain symbol, and the start-stop symbol including a start time domain symbol and/or an end time domain symbol; determine the at least one time domain symbol in the second symbol set according to the symbol information.

In an embodiment, if the symbol information includes the position of the start-stop symbol, the value on the second bit field represents a number of time domain symbols that separate the start-stop symbols from a reference symbol.

In an embodiment, the reference symbol includes: a first time domain symbol in the first time domain unit; or a first reference symbol, where the first reference symbol is separated from a start time domain symbol or an end time domain symbol for transmitting the control channel by an integer number of time domain units, and the first reference symbol and the start-stop symbol are separated by less than one time domain unit; or a second reference symbol, where the second reference symbol is separated from a start time domain symbol or an end time domain symbol for transmitting a control resource set by an integer number of time domain units, and the second reference symbol and the start-stop symbol are separated by less than one time domain unit.

In an embodiment, if the value on the second bit field belongs to the second value set, a transceiver 1220 is further configured to: transmit a reference signal with the network device on a start time domain symbol of the at least one time domain symbol or on a previous adjacent time domain symbol of the start time domain symbol.

In an embodiment, if the value on the second bit field belongs to a first value set, the transceiver 1220 is further configured to: transmit a reference signal with the network device on a preset time domain symbol in the second time domain unit.

In an embodiment, the preset time domain symbol is a third time domain symbol or a fourth time domain symbol in the second time domain unit.

In an embodiment, a value on the first bit field represents a number of time domain units that separate the second time domain unit from the first time domain unit.

In an embodiment, if frequency bands for transmitting the data channel are different, the first symbol set is the same or the first symbol sets are different.

In an embodiment, the transceiver 1220 is specifically configured to: receive, on the first time domain unit, downlink control information (DCI) which is transmitted by the network device and carried in the control channel, where the DCI including the resource indication information.

In an embodiment, the time domain unit is a time slot or a subframe.

In an embodiment, the reference signal is a demodulation reference signal (DMRS).

It should be understood that, in the embodiments of the present application, the processor 1210 may be a central processing unit (CPU), and the processor 1210 may also be other general processors, a digital signal processor (DSP), an application specific integrated circuit (ASIC), a field programmable fate array (FPGA) or other programmable logic devices, a discrete gate or a transistor logic device, a discrete hardware component, and the like. The general processor may be a microprocessor, or the processor may be any conventional processor or the like.

The memory 1230 can include a read only memory and a random access memory, and can provide instructions and data to the processor 1210. A portion of the memory 1230 can also include a non-volatile random access memory.

During the implementation process, each step of the above method may be completed by an integrated logic circuit of hardware in the processor 1210 or by an instruction in a form of software. The steps of the method for transmitting data disclosed in the embodiments of the present application may be directly embodied as being performed and completed by a hardware decoding processor, or may be performed and completed by a combination of hardware and software modules in the processor 1210. The software module can be located in a random access memory, a flash memory, a read only memory, or a programmable read only memory, or a mature storage medium in the art such as an electrically erasable programmable memory or a register. The storage medium is located in the memory 1230, and the processor 1210 reads information in the memory 1230 and completes steps of the above method by combining its hardware, which will not be described in detail herein to avoid repetition.

The terminal device 1200 according to the embodiment of the present application may correspond to the terminal device for performing the method 200 in the above method 200 and the terminal device 1000 according to the embodiment of the present application, and each unit or module in the terminal device 1200 is respectively configured to perform each operation or process performed by the terminal device in the above method 200, details thereof will not be repeated herein for brevity.

Figure 13:
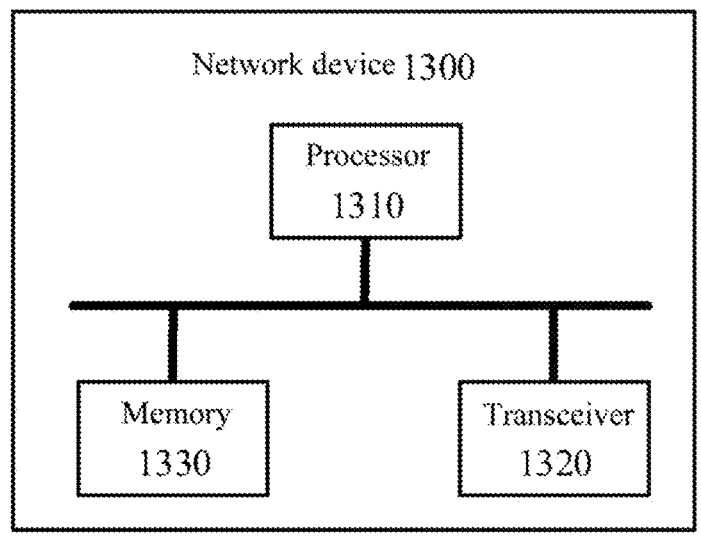
FIG. 13 is a schematic structural diagram of a network device according to an embodiment of the present application.

FIG. 13 is a schematic structural diagram of a network device 1300 according to an embodiment of the present application. As shown in FIG. 13, the network device includes a processor 1310, a transceiver 1320 and a memory 1330, where the processor 1310, the transceiver 1320 and the memory 1330 communicate with each other through internal connection paths. The memory 1330 is configured to store instructions, the processor 1310 is configured to execute the instructions stored in the memory 1330, to control the transceiver 1320 to receive signals or transmit signals. Where, the processor 1310 is configured to:

determine a second time domain unit for transmitting data channel and at least one time domain symbol for transmitting the data channel in the second time domain unit, where the time domain unit includes a plurality of time domain symbols; if the at least one time domain symbol refers to all time domain symbols in a first symbol set, set a value on a second bit field in the resource indication information to be transmitted to a value of a first value set; if the at least one time domain symbol refers to a time domain symbol determined by the network device in the second symbol set for a terminal device, set the value on the second bit field to a value corresponding to the at least one time domain symbol;

the transceiver 1320 is configured to: transmit, a control channel to the terminal device on a first time domain unit, where the control channel carries the resource indication information, the resource indication information includes a first bit field and the second bit field, the first bit field indicates the second time domain unit, the second bit field indicates the at least one time domain symbol; transmit the data channel with the terminal device on the at least one time in the second time domain unit.

In an embodiment, the processor 1310 is specifically configured to: determine a value corresponding to symbol information according to the symbol information of the at least one time domain symbol, where the symbol information includes a position of a start-stop symbol in the at least one time domain and/or a number of the at least one time domain symbol, and the start-stop symbol includes a start time domain symbol and/or an end time domain symbol; set the value on the second bit field to a value corresponding to the symbol information.

In an embodiment, if the symbol information includes the position of the start-stop symbols, the value on the second bit field represents a number of time domain symbols that separate the start-stop symbol from a reference symbol.

In an embodiment, the reference symbol includes any one of the following: a first time domain symbol in the first time domain unit; or a first reference symbol, where the first reference symbol is separated from a start time domain symbol or an end time domain symbol for transmitting the control channel by an integer number of time domain units, and the first reference symbol and the start-stop symbol are separated by less than one time domain unit; or a second reference symbol, where the second reference symbol is separated from a start time domain symbol or an end time domain symbol for transmitting a control resource set by an integer number of time domain units, and the second reference symbol and the start-stop symbol are separated by less than one time domain unit.

In an embodiment, if the at least one time domain symbol refers to a time domain symbol determined by the network device for the terminal device in the second symbol set, the transceiver 1320 is further configured to: transmit a reference signal with the terminal device on a start time domain symbol of the at least one time domain symbol or on a previous adjacent time domain symbol of the start time domain symbol.

In an embodiment, if the at least one time domain symbol refers to all time domain symbols in a first symbol set, the transceiver 1320 is further configured to: transmit a reference signal with the terminal device on a preset time domain symbol in the second time domain unit.

In an embodiment, the preset time domain symbol is a third time domain symbol or a fourth time domain symbol in the second time domain unit.

In an embodiment, a value on the first bit field represents a number of time domain units that separate the second time domain unit from the first time domain unit.

In an embodiment, the first symbol set is the same or different when frequency bands for transmitting the data channel are different.

In an embodiment, the transceiver 1320 is specifically configured to: transmit, on the first time domain unit, downlink control information (DCI) that is carried in the control channel to the terminal device, where the DCI including the resource indication information.

In an embodiment, the time domain unit is a time slot or a subframe.

In an embodiment, the reference signal is a demodulation reference signal (DMRS).

It should be understood that, in the embodiment of the present application, the processor 1310 may be a central processing unit (CPU), and the processor 1310 may also be other general processors, a digital signal processor (DSP), application specific integrated circuits (ASIC), a field programmable gate array (FPGA) or other programmable logic devices, a discrete gate or a transistor logic device, a discrete hardware component, etc. The general processor may be a microprocessor, or the processor may be any conventional processor, etc.

The memory 1330 may include a read only memory and a random access memory, and may provide instructions and data to the processor 1310. A portion of the memory 1330 can also include a non-volatile random access memory. During the implementation process, each step of the above method may be completed by an integrated logic circuit of hardware in the processor 1310 or by an instruction in a form of software. The steps of the method for transmitting data disclosed in the embodiments of the present application may be directly embodied as being performed and completed by a hardware decoding processor, or may be performed and completed by a combination of hardware and software modules in the processor 1310. The software module can be located in a random access memory, a flash memory, a read only memory, or a programmable read only memory, or a mature storage medium in the art such as an electrically erasable programmable memory or a register. The storage medium is located in the memory 1330, and the processor 1310 reads information in the memory 1330 completes steps of the above method by combining its hardware, which will not be described in detail herein to avoid repetition.

The network device 1300 according to the embodiment of the present application may correspond to the network device for performing a method 900 in the above method 900 and the network device 1100 according to the embodiment of the present application, and each unit or module in the network device 1300 is respectively configured to perform each operation or process performed by the terminal device in the above method 900, details thereof will not be repeated herein for brevity.

Figure 14:
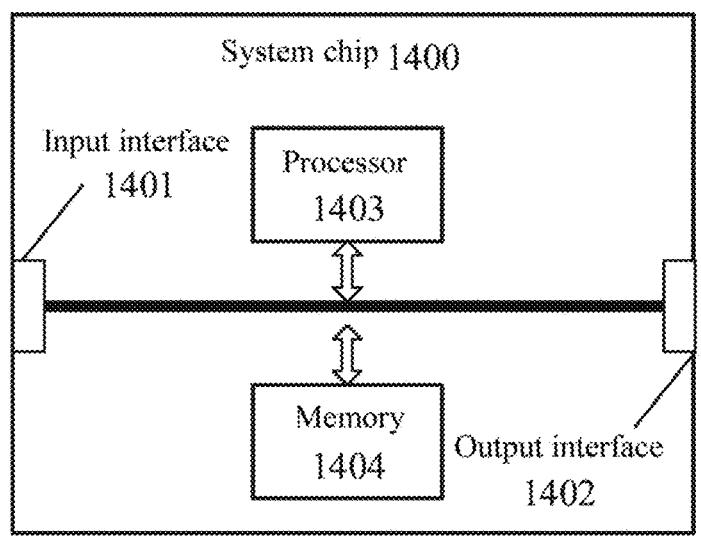
FIG. 14 is a schematic structural diagram of a system chip according to an embodiment of the present application.

FIG. 14 is a schematic structural diagram of a system chip 1400 according to an embodiment of the present application. The system chip 1400 in FIG. 14 includes an input interface 1401, an output interface 1402, a processor 1403 and a memory 1404. The input interface 1401, the output interface 1402, the processor 1403 and the memory 1404 are interconnected by internal connection paths. The processor 1403 is configured to execute a code in the memory 1404.

In an embodiment, when the code is executed, the processor 1403 can implement the method 200 performed by the terminal device in the method embodiments, which will not be repeated herein for brevity.

In an embodiment, when the code is executed, the processor 1403 can implement the method 900 performed by the network device in the method embodiments, which will not be repeated herein for brevity.

Those of ordinary skill in the art will appreciate that units and algorithm steps of each example described with reference to the embodiments disclosed herein can be implemented in electronic hardware or a combination of computer software and electronic hardware. Whether these functions are executed in hardware or software depends on the specific application and design constraints of the solution. For each specific application, a person skilled in the art can use different methods for implementing the described functions, but such implementation should not be considered to be beyond the scope of the present application.

A person skilled in the art can clearly understand that for convenience and brevity of the description, the specific working process of the the system, device and unit described above may refer to corresponding processes in the above method embodiments, and will not be repeated herein.

In the several embodiments provided by the present application, it should be understood that the disclosed systems, devices, and methods may be implemented in other ways. For example, the device embodiments described above are merely illustrative. For example, the division of the unit is only a logical function division, and there may be other division ways in actual implementations, for example, multiple units or components may be combined or integrated into another system, or some features may be ignored or not executed. In addition, the coupling or direct coupling or communication connection shown or discussed herein may be an indirect coupling or communication connection of devices or units through some interfaces, and may be electrical, mechanical or in other forms.

The units described as separate components may be or may not be physically separated, and the components displayed as units may be or may not be physical units, that is, they may be located in one place, or may be distributed onto multiple network units. Some or all of the units may be selected according to actual needs for the purpose of the solution of the present embodiment.

In addition, each functional unit in each embodiment of the present application may be integrated into one processing unit, or each unit may physically exist, separately, or two or more units may be integrated into one unit.

The functions may be stored in a computer readable storage medium if implemented in the form of a software functional unit, and sold or used as a standalone product. Based on such understanding, the technical solution of the present application, in essence, or the part contributing to the existing technology or a part of the technical solution can be embodied in the form of a software product, which is stored in a storage medium and includes instructions for enabling a computer device (which may be a personal computer, a server, or a network device, etc.) to perform all or part of the steps described in the methods in each embodiment of the present application. The above storage medium includes various media that can store a program code, such as a U disk, a mobile hard disk, a read-only memory (ROM), a random access memory (RAM), a magnetic disk, or an optical disk.

The above is only a specific implementation manner of the present application, the protection scope of the present application is not limited thereto, and changes or substitutions that can easily be thought of by those skilled in the art within the technical scope disclosed in the present application should be covered by the protection scope of the present application. Therefore, the protection scope of the present application should be subject to the protection scope of the claims.

What is claimed is:

1. A method for transmitting data, wherein the method comprises:
   receiving, by a terminal device, on a first time domain unit, a control channel transmitted by a network device, wherein the control channel carries resource indication information, the resource indication information comprises a first bit field and a second bit field, the first bit field is a time slot level indication and indicates at least one time slot occupied by a second time domain unit for transmitting a data channel scheduled by the control channel, the second bit field is a symbol level indication and indicates at least one time domain symbol occupied by the data channel in the second time domain unit, and each of the first time domain unit and the second time domain unit comprises a plurality of time domain symbols;
   determining, by the terminal device, the at least one time slot occupied by the second time domain unit according to the first bit field;
   if a value on the second bit field belongs to a first value set, determining, by the terminal device in the determined at least one time slot, to use all time domain symbols in a first symbol set as the at least one time domain symbol, wherein the first symbol set is used for slot-based scheduling;
   if the value on the second bit field belongs to a second value set, determining, by the terminal device in the determined at least one time slot, that the at least one time domain symbol comprises a time domain symbol in a second symbol set corresponding to the value on the second bit field, wherein the second value set does not overlap with the first value set, and the second symbol set is used for non-slot-based scheduling; and
   transmitting, by the terminal device, the data channel with the network device on the at least one time domain symbol in the second time domain unit;
   wherein the determining, by the terminal device in the determined at least one time slot, that the at least one time domain symbol comprises a time domain symbol in a second symbol set corresponding to the value on the second bit field comprises:
   determining, by the terminal device, symbol information corresponding to the value on the second bit field according to the value on the second bit field and the second symbol set, wherein the symbol information comprises: positions of a start time domain symbol and an end time domain symbol in the at least one time domain symbol, or a start time domain symbol in the at least one time domain symbol and a number of the at least one time domain symbol, or an end time domain symbol in the at least one time domain symbol and a number of the at least one time domain symbol; and
   determining, by the terminal device in the determined at least one time slot, the at least one time domain symbol in the second symbol set according to the symbol information.

2. The method according to claim 1, wherein if the symbol information comprises the positions of the start time domain symbol and the end time domain symbol, the value on the second bit field represents a numbers of time domain symbols that separate the start time domain symbol and the end time domain symbol from a reference symbol.

3. The method according to claim 2, wherein the reference symbol comprises:
   a first time domain symbol in the first time domain unit; or
   a first reference symbol, wherein the first reference symbol is separated from a start time domain symbol or an end time domain symbol for transmitting the control channel by an integer number of time domain units, and the start time domain symbol and the end time domain symbol in the at least one time domain symbol are separated from the first reference symbol by less than one time domain unit; or
   a second reference symbol, wherein the second reference symbol is separated from a start time domain symbol or an end time domain symbol for transmitting a control resource set by an integer number of time domain units, and the start time domain symbol and the end time domain symbol in the at least one time domain symbol are separated from the second reference symbol by less than one time domain unit.

4. The method according to claim 1, wherein if the value on the second bit field belongs to the second value set, the method further comprises:
   transmitting, by the terminal device, a reference signal with the network device on the start time domain symbol of the at least one time domain symbol or on a previous adjacent time domain symbol of the start time domain symbol of the at least one time domain symbol.

5. The method according to claim 1, wherein if the value on the second bit field belongs to the first value set, the method further comprises:
   transmitting, by the terminal device, a reference signal with the network device on a preset time domain symbol in the second time domain unit.

6. The method according to claim 1, wherein a value on the first bit field represents a number of time domain units that separate the second time domain unit from the first time domain unit.

7. The method according to claim 1, wherein the receiving, by a terminal device, on a first time domain unit, a control channel transmitted by a network device comprises:
   receiving, by the terminal device, on the first time domain unit, downlink control information (DCI) which is transmitted by the network device and carried in the control channel, wherein the DCI comprises the resource indication information.

8. A terminal device, wherein the terminal device comprises a processor, a transceiver and a memory, wherein:
the transceiver is configured to receive, on a first time domain unit, a control channel transmitted by a network device, wherein the control channel carries resource indication information, the resource indication information comprises a first bit field and a second bit field, the first bit field is a time slot level indication and indicates at least one time slot occupied by a second time domain unit for transmitting a data channel scheduled by the control channel, the second bit field is a symbol level indication and indicates at least one time domain symbol occupied by the data channel in the second time domain unit, and each of the first time domain unit and the second time domain unit comprises a plurality of time domain symbols;
wherein the memory has executable instructions stored thereon that when executed by the processor cause the processor to: determine the at least one time slot occupied by the second time domain unit according to the first bit field; if a value on the second bit field belongs to a first value set, determine to use all time domain symbols in a first symbol set in the determined at least one time slot as the at least one time domain symbol, wherein the first symbol set is used for slot-based scheduling; and, if the value on the second bit field belongs to a second value set, determine that the at least one time domain symbol comprises a time domain symbol in a second symbol set in the determined at least one time slot corresponding to the value on the second bit field, wherein the second value set does not overlap with the first value set, and the second symbol set is used for non-slot-based scheduling; and
wherein the transceiver is further configured to transmit the data channel with the network device on the at least one time domain symbol in the second time domain unit;
the processor is configured to:
determine symbol information corresponding to the value on the second bit field according to the value on the second bit field and the second symbol set, wherein the symbol information comprises: positions of a start time domain symbol and an end time domain symbol in the at least one time domain symbol, or a start time domain symbol in the at least one time domain symbol and a number of the at least one time domain symbol, or an end time domain symbol in the at least one time domain symbol and a number of the at least one time domain symbol; and
determine the at least one time domain symbol in the determined second symbol set in the at least one time slot according to the symbol information.

9. The terminal device according to claim 8, wherein if the symbol information comprises the positions of the start time domain symbol and the end time domain symbol, the value on the second bit field represents numbers of time domain symbols that separate the start time domain symbol and the end time domain symbol from a reference symbol.

10. The terminal device according to claim 9, wherein the reference symbol comprises:
a first time domain symbol in the first time domain unit; or
a first reference symbol, wherein the first reference symbol is separated from a start time domain symbol or an end time domain symbol for transmitting the control channel by an integer number of time domain units, and the start time domain symbol and the end time domain symbol in the at least one time domain symbol are separated from the first reference symbol by less than one time domain unit; or
a second reference symbol, wherein the second reference symbol is separated from a start time domain symbol or an end time domain symbol for transmitting a control resource set by an integer number of time domain units, and the start time domain symbol and the end time domain symbol in the at least one time domain symbol are separated from the second reference symbol by less than one time domain unit.

11. The terminal device according to claim 8, wherein if the value on the second bit field belongs to the second value set, the transceiver is further configured to:
transmit a reference signal with the network device on the start time domain symbol of the at least one time domain symbol or on a previous adjacent time domain symbol of the start time domain symbol of the at least one time domain symbol.

12. The terminal device according to claim 8, wherein if the value on the second bit field belongs to the first value set, the transceiver is further configured to:
transmit a reference signal with the network device on a preset time domain symbol in the second time domain unit.

13. The terminal device according to claim 12, wherein the preset time domain symbol is a third time domain symbol or a fourth time domain symbol in the second time domain unit.

14. The terminal device according to claim 8, wherein a value on the first bit field represents a number of time domain units that separate the second time domain unit from the first time domain unit.

15. The terminal device according to claim 8, wherein if frequency bands for transmitting the data channel are different, the first symbol set is the same or the first symbol sets are different.

16. The terminal device according to claim 8, wherein the transceiver is configured to:
receive, on the first time domain unit, downlink control information (DCI) which is transmitted by the network device and carried in the control channel, wherein the DCI comprises the resource indication information.

17. The terminal device according to claim 8, wherein the time domain unit is a time slot or a subframe.

18. The terminal device according to claim 11, wherein the reference signal is a demodulation reference signal (DMRS).

* * * * *